United States Patent

Gabriel et al.

[11] Patent Number: 6,103,036
[45] Date of Patent: Aug. 15, 2000

[54] MICROPOROUS PRESSED MOLDED THERMAL INSULATOR BODY AND METHOD FOR ITS PRODUCTION

[75] Inventors: Reinhard Gabriel, Waltenhofen; Hannes Reisacher, Durach, both of Germany

[73] Assignee: Porextherm-Dammstoffe GmbH, Kempten, Germany

[21] Appl. No.: 08/954,811

[22] Filed: Oct. 12, 1997

[51] Int. Cl.[7] .......................... B29C 65/06; B29C 31/00; B29C 63/00; B32B 31/00
[52] U.S. Cl. .......................... 156/84; 156/73.5; 156/85; 156/213; 156/272.4; 156/303.1; 264/171.1; 264/297.9
[58] Field of Search .................. 428/34.4, 34.5, 428/34.6, 34.7, 34.9, 323, 325, 327, 428, 688, 71, 76; 264/445, 163, 171.1, 248, 297.1, 297.9; 156/70, 73.5, 84, 85, 213, 272.4, 293, 294, 296, 297, 303.1, 304.1

[56] References Cited

U.S. PATENT DOCUMENTS

| | | | |
|---|---|---|---|
| 3,962,014 | 6/1976 | Hughes et al. | 156/276 |
| 4,210,070 | 7/1980 | Tatum et al. | 98/40 |
| 4,564,547 | 1/1986 | Hughes | 428/117 |
| 4,789,512 | 12/1988 | Hughes | 264/120 |
| 5,236,758 | 8/1993 | Sextl et al. | 428/74 |
| 5,389,420 | 2/1995 | Sextl et al. | 428/74 |
| 5,624,726 | 4/1997 | Sanocki et al. | 428/74 |
| 5,759,659 | 6/1998 | Sanocki et al. | 428/74 |
| 5,792,539 | 8/1998 | Hunter | 428/72 |

FOREIGN PATENT DOCUMENTS

| | | |
|---|---|---|
| 2572332A1 | 5/1986 | France . |
| 4106727 | 11/1995 | Germany . |

*Primary Examiner*—Paul Thibodeau
*Assistant Examiner*—Sheeba Ahmed
*Attorney, Agent, or Firm*—Horst M. Kasper

[57] ABSTRACT

A molded thermal insulator body, in particular a thermal insulator plate comprises, for the purposes of a better flexibility, a prepressed base body (1) substantially containing at least one center layer (3), predominantly made of a highly dispersed ceramic material such as silica aerogel ($SiO_2$), and an upper and a lower support layer (2), predominantly made out of flexible paper, foil, cardboard, or felts of ceramic material, or of a mixture of at least two of the same, preferably of ceramic paper, foil or cardboard, and wherein the base body is enveloped by a shrinkable plastic foil (4).

6 Claims, 1 Drawing Sheet

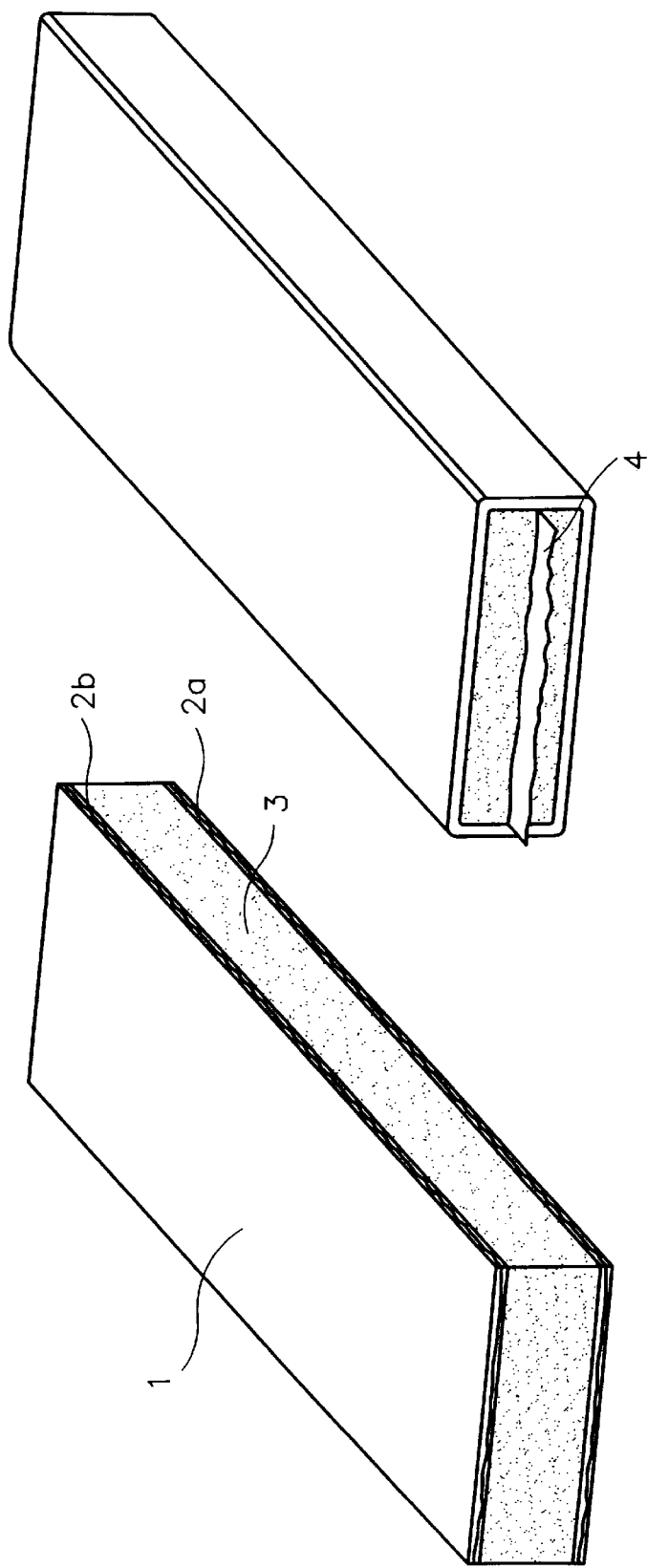

MICROPOROUS PRESSED MOLDED THERMAL INSULATOR BODY AND METHOD FOR ITS PRODUCTION

BACKGROUND OF THE INVENTION

1. Field of the Invention

The invention relates to a microporous pressed molded thermal insulator body, in particular for high-temperature applications, substantially comprising a base body made of a highly dispersed silica aerogel and/or metal oxides with fiber reinforcement and opacifier and a cover out of shrinkable plastic foils.

2. Brief Description of the Background of the Invention Including Prior Art

A method for the production of such thermal insulator bodies is described in the German printed patent document DE-C2 4,106,727. According to the description, a partial or a complete cover made of a shrinkable plastic foil is shrunk onto the pressed base body, where the base body was pressed beforehand without a cover. The base body can also be covered with a metal foil. For balancing the high thermal conductivity of the metal cover, the base body must, naturally, be made thicker, which impairs the flexibility of the thermal insulator bodies.

A thermal insulator body, made of a mixture of pyrogenic silica and opacifier, is known from the German printed patent document DE 2,729,609-A1. The mixture is in this case continuously entered and filled into a cover or envelope, made of a flat material such as a tube, and the filled tube is subdivided without separating crosswise to the longitudinal direction of the tube and is pressed under heat application onto the cover to a strand or series of plates. The tube is to be formed according to one embodiment of the method out of two individual bands of the flat material, running together in the region of the filling of the flat material by joining at the side edges.

The German printed patent document DE 2,712,625 A1 describes a method for the production of insulating plates out of a mixture of finely dispersed silica and a clouding agent. The finely dispersed silica is in this case filled into a sack or bag, and the cover is brought to a predefined temperature during the pressing process such that the cover afterwards surrounds the core material under tension. Shrink foils are employed for obtaining thermal insulating plates against cold, and glass fiber is employed for covers for the thermal insulating plates against heat. Glass fibers or, respectively, glass fabrics have a low bending strength and a low wear stability and become brittle at 500° C. The latter limits the application of the thermal insulating plates made according to this method to low temperature regions. In addition, the powdery thermal insulating material can be easily anchored in its rough and porous surface such that bending applications (be it in case of a one-sided thermal application or during bending) result in breakage. This can even occur already during the shrinking process.

This holds also for the thermal insulator bodies, enveloped with a fabric sack or bag made of quartz fibers, as described in the German printed patent document DE 2,928,695-A1. According to this printed document, a sliding agent in the shape of dispersions, such as emulsions or suspensions, pastes or powders, is furnished for avoiding these disadvantages. These pastes or powders are applied to the inner side of the cover which is cumbersome and time-consuming and which makes the product substantially more expensive. In addition, the applied layer can easily form lumps during the filling of the thermal insulating material and thus cause rejects. In particular, however, the separating material can displace the pores of the adjoining material layers such that a lesser thermal insulation has to be accepted. This could in fact be avoided and prevented by a correspondingly larger thickness of the plates, however, this again would not allow the occurrence of larger bending angles.

Since finely dispersed powders, such as a mixture of pyrogenic silica and clouding agent, are not capable to flow, i.e. are not free-flowing, according to the teachings of the German printed patent document DE 2,928,695-A1, a uniform pressing up into the edge zones does not occur during the pressing into bag-like covers such that a uniform densification is not assured, and in particular the edges can crack and crumble off in case of thermal insulator bodies produced according to this method. Cracked edges usually result in a breaking apart of the thermal insulator body. In addition, based on non-uniform densification and the associated thickening, the cover does not cling at all. Places such that hollow spaces, leading to a crack formation, are generated.

SUMMARY OF THE INVENTION

1. Purposes of the Invention

It is an object of the present invention to provide thermal insulator bodies of the initially recited kind of a uniform thickness and of a better flexibility, which exhibits even in case of a lesser thickness a substantially good thermal insulation.

These and other objects and advantages of the present invention will become evident from the description which follows.

2. Brief Description of the Invention

The present invention provides a molded thermal insulator body. A ceramic layer includes a highly dispersed ceramic material and has a lower side and an upper side. A lower support layer consists of a member of the group selected from ceramic paper, ceramic foil, cardboard, ceramic felt, ceramic fleece, and composites thereof and adjoins the lower side of the ceramic layer. An upper support layer consists of a member of the group selected from ceramic paper, ceramic foil, cardboard, ceramic felt, ceramic fleece, and composites thereof and adjoins the upper side of the ceramic layer. The lower support layer, the ceramic layer, and the upper support layer form a pressed base body. A shrinkable plastic foil envelopes the base body.

The lower support layer can be a composite of two members of the group selected from ceramic paper, ceramic foil, cardboard, ceramic felt, and ceramic fleece. The upper support layer can be a composite of two members of the group selected from ceramic paper, ceramic foil, cardboard, ceramic felt, and ceramic fleece. The highly dispersed ceramic material can be silica aerogel ($SiO_2$). The molded thermal insulator body can be formed as a thermal insulating plate.

A second pressed base body can adjoin the pressed base body and can be enveloped by given shrinkable plastic foil.

The ceramic material of the ceramic layer can be made of a member of the group selected from a finely porous silica aerogel, metal oxides, a fiber reinforcement, a clouding agent, a hardener, and composites thereof.

The shrinkable plastic foil can be made of polyethylene.

The shrinkable plastic foil can exhibit a thickness of from 4 $\mu$m to 15 $\mu$m.

The pressed base body can include a glass fiber fabric as an intermediate layer.

The pressed base body can include a deformable metal foil as an intermediate layer.

The present invention provides in addition for a method for the production of molded thermal insulator bodies, wherein the ceramic material of a ceramic layer is mixed with additives. The ceramic material is placed onto a lower support layer disposed in a mold. The ceramic layer and the lower support layer are slightly prepressed. The upper support layer is applied to the ceramic layer. The lower support layer, the ceramic layer, and the upper support layer are pressed for forming a base body. The base body is enveloped with a shrinkable plastic foil. The enveloped base body is placed into a device inducing a shrinkage of the shrinkable plastic foil. The shrinkable plastic foil can be furnished as a polyethylene bag.

A plurality of base bodies can be inserted into a tube made of a shrinkable plastic material, said plurality being furnished at a spacing from each other required for a welding. The tube can then be welded between the base bodies and, simultaneously, the enveloped molded thermal insulator bodies can be separated from each other. The foil can then be shrunk onto the base bodies under irradiation in a shrinking tunnel.

The object of the invention is achieved with a thermal insulator body which can be made out of a ceramic layer, comprising a substantially highly-dispersed ceramic material, such as an aerogel of silica ($SiO_2$) and an upper layer and a lower layer, made predominantly out of bendable ceramic paper, a ceramic foil, cardboard or a ceramic fleece as support layers, where the ceramic layer and the upper and lower layer form a base body, and where the base body is enveloped and covered by a shrinkable plastic foil.

The advantages associated with the present invention comprise in particular the extraordinary flexibility of the thermal insulator bodies. The thermal insulator bodies can also be adapted to irregular shapes without breaking apart and damage to the envelope or cover is thereby also prevented. The thermal insulator bodies are thermally stable up to 1435° C. and exhibit moreover beyond that also the property of binding the highly porous mass.

In particular, the two lateral support layers, made out of a ceramic paper or, respectively, of foils or cardboard, are providing to the pressed masses a substantial uniformity of the structure and thus a large mechanical stability of the thermal insulator bodies, in particular of plates, and rejects, generated during enveloping and covering, are avoided.

Shrinking foils made of cross-linkable plastic materials, preferably made of polyethylene or the like, and based on thermal crosslinking or chemical crosslinking induced by irradiation, can be used as covers. These envelopes or covers, according to the present invention, are employed in the form of foils, of bags, or of tubes.

A central slightly deformable metal foil is advantageous in case of irregularly formed bodies, since this metal foil furnishes an inherent shape stability to the molded thermal insulator bodies.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 1 is a perspective view of a base body;

FIG. 2 is a perspective view of an enveloped and covered base body according to FIG. 1.

DESCRIPTION OF INVENTION AND PREFERRED EMBODIMENT

The present invention provides for a molded thermal insulator body and in particular a thermal insulating plate. A pressed base body 1 substantially includes a ceramic layer 3, predominantly comprising a highly dispersed ceramic material such as silica aerogel $SiO_2$, and an upper and a lower support layer 2 comprising a ceramic paper, a ceramic foil, cardboard, a ceramic felt or fleece, or a layer of at least two of the same. The base body is enveloped and covered by a shrinkable plastic foil 4.

The molded thermal insulator body can include at least two base bodies 1. The ceramic material can be made of a finely porous silica aerogel and/or metal oxides with a fiber reinforcement and opacifier agent and possibly a hardener.

The envelope or cover 4 can be made of polyethylene. The cover 4 can exhibit a thickness of from 4 $\mu$m to 15 $\mu$m.

The base body 1 can include a glass fiber fabric as an intermediate layer or the base body 1 can include a deformable metal foil as an intermediate layer.

The present invention further provides for a method for the production of molded thermal insulator bodies. The ceramic material of the ceramic layer is mixed with additives. The ceramic material is placed onto the lower support layer, disposed for example in a mold. The two layers are slightly prepressed. The upper support layer 2a is applied to the layered ceramic layer 3. This base body 1 is pressed. The base body is enveloped with a shrinkable plastic foil 4. The enveloped base body is placed into a shrinking device.

The base body 1 can be enveloped with a polyethylene bag 4.

A plurality of base bodies 1 can be inserted into a tube made of a shrinkable plastic material at a spacing from each other required for a welding. The tube can then be welded between the base bodies. Simultaneously, the enveloped molded thermal insulator bodies can be separated from each other. The foil can then be shrunk onto the base bodies under irradiation in a shrinking tunnel.

The structure obtained according to the present invention is shown in FIGS. 1 and 2. The pressed body 1 includes a lower support layer 2a made of a ceramic paper and an upper support layer 2b made of a ceramic paper. The ceramic layer 3 is made of a highly dispersed ceramic material. The cover 4 shown in FIG. 2 is made of a polyethylene bag, providing an envelope covering the pressed base body.

EXAMPLE 1

An 8 mm thick, previously pressed, microporous base body plate 1, comprises a ceramic layer 3 and exhibits the following composition 63.7 weight-percent finely dispersed metal oxide 30.3 weight-percent opacifier 6.0 weight-percent fiber material The microporous base body plate 1 furnishes the center layer. This ceramic layer together with the pressed support layer 2a of ceramic paper, adjoining the upper surface of the center layer, and with the pressed support layer 2b of ceramic paper, adjoining the lower surface of the ceramic layer are inserted into bags 4, wherein said bags 4 are adapted to the dimensions of the base body plate 1 plus support layers 2a, 2b and easily receive the base body plate 1 plus support layers 2a, 2b, and wherein said bags are made of a 7 μm thick polyethylene foil, and wherein the bags are welded with a welding device at the open side. The enveloped and covered thermal insulator bodies, placed on the conveyer belt, are continuously transported through a shrinking tunnel. The grates of the conveyer belt allow interaction with the hot gases from all sides in the shrinking tunnel.

The generated plates have a size of 100×100 cm$^2$ and smaller and are preferably from about 20×20 cm$^2$ to 80×80 cm$^2$.

The base bodies are lightly prepressed upon application of pressures of from 1 to 40 kg/m$^2$ and are then pressed at an operating pressure of 100 t/m$^2$. The pressure range is from 1 t/m$^2$ to 1000 t/m$^2$.

Examples for highly porous, finely dispersed metal oxide are pyrogenically generated silica, including electric arc generated silica, precipitated silica low in alkali, as well as aluminum oxide, titanium oxide, and zirconium oxide produced by precipitation or electric arc. The metal oxides exhibit specific surfaces of from 50–700 qm/g, preferably of from 70–400 qm/g.

Ilmenite (FeTiO$_3$), rutile (TiO$_2$), pure titanium oxide, zirconium silicate (ZrSiO$_4$), iron-(II)-iron-(III)-mixed oxide, chromium dioxide, zirconium oxide, manganese dioxide can be employed as opacifiers. The opacifiers preferably exhibit an absorption maximum in the infrared region between 1.5 and 10 μm. The required amounts are from 10 to 40 weight percent.

The fiber material can be made out of glass wool, rock wool, basalt wool, slag wool, mineral wool, ceramic fiber as they are obtained from melts of aluminum oxide or silicon dioxide as well as from their mixtures.

Kaolin, vermiculite, and perlite can be employed as additives and fillers, respectively.

The ceramic support layers (paper, cardboard, felts, fleece) include, for example silica fibers such as aluminum silicate fibers, Ca silicate fiber, Mg silicate fibers or mixtures thereof, or of glass fibers or of silica fibers out of pure SiO$_2$.

The invention thermal insulator bodies have a planar form which is flexible on both planes. The thermal insulator bodies can assume the form of circular segments or the like based on their structure. It is possible to bend and unbend the thermal insulator bodies at a ratio E/D=14 without the core exhibiting tearings or other damages after such a bending process. In this case, E is the radius of the circular body covered by the plates, and D is the thickness of the plate. The thermal insulator bodies can thus be adapted true to contour to the surface of the body to be insulated, wherein the thermal insulator bodies keep their characteristic form, which is of a decisive importance for the effectiveness of the insulation.

The elasticity and pliancy is based on the both fire-proof and insulating support layers (2) made of ceramic material, wherein said support layers exhibit the good sliding properties and are pressed with and to the two sides of the core layer.

Further examples for the enveloping or covering material are foils and bags, respectively, on the basis of organic polymers of acrylic ester butadiene rubber, acrylic ester chloroethylene vinyl ether copolymers, terpolymers of tetrafluoroethylene. Preferred foils on the basis of organic polymers are foil on the basis of polyethylene and/or polyamide and/or polyvinyl chloride.

EXAMPLE 2

A ceramic layer having a thickness of 23 mm after pressing comprises 63.7 weight-percent finely dispersed metal oxide 30.3 weight-percent opacifier, i.e. zirconium silicate 6.0 weight-percent aluminum fiber material The center layer is furnished on the top and on the bottom with a 3 mm thick support layer of a ceramic fiber fleece and is pressed in a device to a base plate with a thickness of 25 mm.

Base plates of this kind are placed in series onto a welding table and are inserted into a 9 μm thick polyethylene tube, while maintaining in each case a spacing between the individual plates, wherein a welding tool is employed at the spacings for welding the covered base plates at their edges extending perpendicular to the transport direction. Thus, the welding is performed on the spacings left between the successively disposed base plates. Then, the tube is placed onto a conveyer belt and the cross-linking reaction is brought about in a shrinking tunnel at 5 . . . 20 Mrad, depending on the type of the polyethylene, which in turn depends on the kind and quantity of the employed stabilizer. Thereupon, the tube passes onto a cutter table, wherein the individual covered thermal insulator bodies are separated from each other.

It will be understood that each of the elements described above, or two or more together, may also find a useful application in other types of form bodies differing from the types described above.

While the invention has been illustrated and described as embodied in the context of a microporous pressed molded thermal insulator body and method for its production, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for the production of molded thermal insulator bodies, comprising the steps of: mixing ceramic material with additives to form a ceramic layer; placing the ceramic layer onto a lower support layer, disposed in a mold; pressing the ceramic layer and the lower support layer; applying an upper support layer to the ceramic layer; pressing the lower support layer, the ceramic layer and the upper support layer to form a base body; placing a plurality of base bodies into an enveloping cover made of a shrinkable plastic material, said plurality of base bodies being spaced from one another and the enveloping cover being welded at locations between the base bodies such that the base bodies are separated from each other; and shrinking the plastic material by irradiation so as to envelope the base bodies.

2. The method according to claim 1, wherein the base bodies are enveloped by a polyethylene bag.

3. The method according to claim 1, wherein the enveloping cover is a foil.

4. The method according to claim 1, wherein the enveloping cover is a bag.

5. The method according to claim 1, wherein the enveloping cover is a tube.

6. A method for the production of molded thermal insulator bodies comprising the steps of:

mixing ceramic material with additives to form a ceramic layer;

placing the ceramic layer onto a lower support layer, disposed in a mold;

pressing the ceramic layer and the lower support layer;

applying an upper support layer to the ceramic layer;

pressing the lower support layer, the ceramic layer and the upper support layer to form a base body;

placing a plurality of base bodies into an enveloping cover made of a shrinkable plastic material, wherein the shrinkable plastic material is in the form of a foil or a bag;

said plurality of base bodies being spaced from one another and the enveloping cover being welded at locations between the base bodies such that the base bodies are separated from each other; and shrinking the plastic material by irradiation so as to so as to envelope the base bodies.

* * * * *